United States Patent
Yamaguchi et al.

(10) Patent No.: US 7,767,980 B2
(45) Date of Patent: Aug. 3, 2010

(54) IMAGE PROCESSING SYSTEM, IMAGE PROCESSING METHOD AND COMPUTER READABLE MEDIUM

(75) Inventors: Hiroshi Yamaguchi, Ashigarakami-gun (JP); Hideyasu Ishibashi, Ashigarakami-gun (JP); Kiyohiro Maeda, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 47 days.

(21) Appl. No.: 12/174,404

(22) Filed: Jul. 16, 2008

(65) Prior Publication Data
US 2009/0020709 A1    Jan. 22, 2009

(30) Foreign Application Priority Data
Jul. 17, 2007   (JP)   ............................. 2007-186198
Jun. 26, 2008   (JP)   ............................. 2008-167820

(51) Int. Cl.
*G01N 21/64*   (2006.01)
(52) U.S. Cl. .................................................. 250/458.1
(58) Field of Classification Search .............. 250/458.1; 600/101, 103, 104, 107, 178, 160
See application file for complete search history.

(56) References Cited

U.S. PATENT DOCUMENTS 5,669,871 A * 9/1997 Sakiyama ................... 600/117

2003/0139650 A1 * 7/2003 Homma ....................... 600/181
2003/0229270 A1 * 12/2003 Suzuki et al. ............... 600/178
2005/0219552 A1 * 10/2005 Ackerman et al. .......... 356/603
2005/0283065 A1 * 12/2005 Babayoff ..................... 600/407

FOREIGN PATENT DOCUMENTS

JP   10-165365 A   6/1998

OTHER PUBLICATIONS

Satoru Yamaguchi, et al., "Evaluation of Skin Perfusion After Nipple-Sparing Mastectomy by Indocyanine Green Dye," J. Saitama Med School, Apr. 2005, vol. 32, No. 2, p. 45-50 and English abstract thereof.

* cited by examiner

*Primary Examiner*—David P Porta
*Assistant Examiner*—Kiho Kim
(74) *Attorney, Agent, or Firm*—Sughrue Mion, PLLC

(57) ABSTRACT

Provided is an image processing system including: a specific wavelength image obtaining section that obtains a specific wavelength image being an image of light from an object existing inside a substance, the light belonging to a specific wavelength region; a depth calculator that calculates a depth of the object from a surface of the substance, using a plurality of specific wavelength images corresponding to different specific wavelength regions from each other; and an object image generator that generates an image of the object according to the depth of the object calculated by the depth calculator.

24 Claims, 10 Drawing Sheets

IMAGE PROCESSING SYSTEM, IMAGE PROCESSING METHOD AND COMPUTER READABLE MEDIUM

CROSS REFERENCE TO RELATED APPLICATION

The present application claims priority from a Japanese Patent Applications No. 2007-186198 filed on Jul. 17, 2007 and No. 2008-167820 filed on Jun. 26, 2008, the contents of which are incorporated herein by reference.

BACKGROUND

1. Technical Field

The present invention relates to an image processing system, an image processing method, and a computer readable medium. The present invention particularly relates to an image processing system, an image processing method, and a computer readable medium, which are able to clearly display the image of an object existing inside a substance, e.g. blood vessel inside a living organism, which is difficult to be viewed from the surface.

2. Description of the Related Art

A technology of capturing a video image of a blood flow inside a living organism and irradiating infrared laser light of a wavelength of 780 nm to a living organism while dosing indocyanine green (ICG) into the living organism is known, as is disclosed in "Evaluation of Skin Perfusion after Nipple-sparing Mastectomy by Indocyanine Green Dye", Saitama Medical School 2005, Vol. 32, No. 2, P. 45-50, April 2005. Moreover, so as to overcome blur of images taken by an endoscope, an endoscope disclosed by Japanese Patent Application Publication No. 10-165365, for example, provides image restoration processing using a point spread function of an objective optical system, to an image signal within a predetermined range. This is considered to maintain a large incident light quantity to an image capturing section, while resolving blur of images due to lack of focal depth of the objective optical system.

When an object existing inside a substance, e.g. blood vessel inside a living organism is observed using light reflected from the object or using light emitted from a fluorescent substance such as ICG, the image of the object occasionally blurs. That is, the reflected light or the emitted light are scattered while passing through the substance, thereby blurring the outline of the object. When a doctor performs diagnosis or operation using the endoscope, the position of the object such as blood vessels should desirably be accurately recognized. Therefore it is desired to display a clear image from which the blur of the object outline is corrected. Moreover, a captured image of an object inside a substance should be desirably displayed together with information regarding the depth of the object.

SUMMARY

In view of the above, according to an aspect of the innovations herein, provided is an image processing system, an image processing method, and a computer readable medium, which are capable of solving the above-stated problems. This object is achieved by combinations of features described in the independent claims. The dependent claims define further advantageous and concrete examples of the present invention.

According to an aspect of the innovations herein, provided is an information processing system including: a specific wavelength image obtaining section that obtains a specific wavelength image being an image of light from an object existing inside a substance, the light belonging to a specific wavelength region; a depth calculator that calculates a depth of the object from a surface of the substance, using a plurality of specific wavelength images corresponding to different specific wavelength regions from each other; and an object image generator that generates an image of the object according to the depth of the object calculated by the depth calculator.

According to an aspect of the innovations herein, provided is an image processing method including: obtaining a specific wavelength image being an image of light from an object existing inside a substance, the light belonging to a specific wavelength region; calculating a depth of the object from a surface of the substance, using a plurality of specific wavelength images corresponding to different specific wavelength regions from each other; and generating an image of the object according to the depth of the object calculated in the object depth calculation According to an aspect of the innovations herein, provided is a computer readable medium storing therein a program for an image processing system, and causing the image processing system to function as: a specific wavelength image obtaining section that obtains a specific wavelength image being an image of light from an object existing inside a substance, the light belonging to a specific wavelength region; a depth calculator that calculates a depth of the object from a surface of the substance, using a plurality of specific wavelength images corresponding to different specific wavelength regions from each other; and an object image generator that generates an image of the object according to the depth of the object calculated by the depth calculator.

The summary of the invention does not necessarily describe all necessary features of the present invention. The present invention may also be a sub-combination of the features described above.

BRIEF DESCRIPTION OF THE DRAWINGS

FIG. 4 schematically shows how light is reflected inside the test body 800 or the like.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
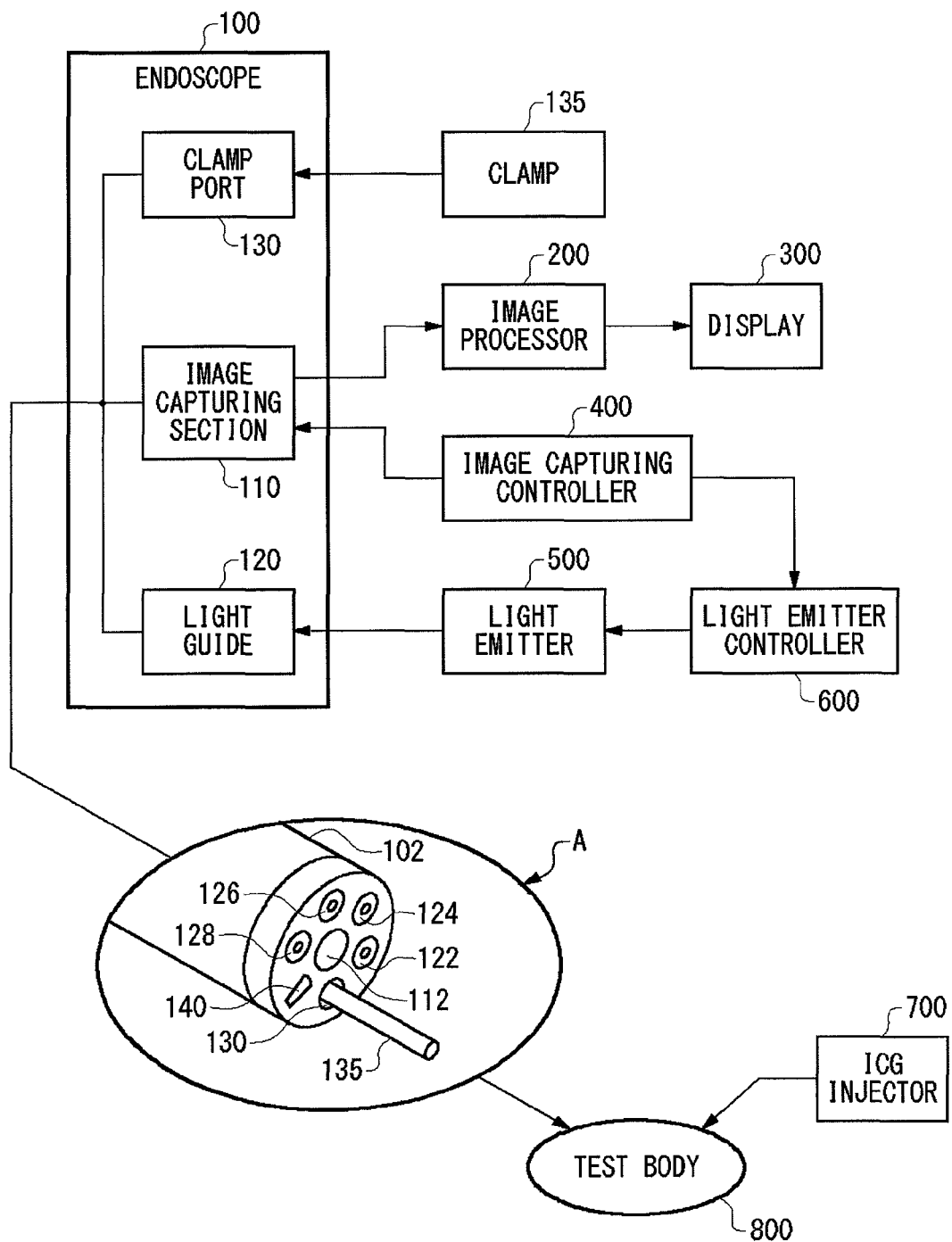
FIG. 1 shows an exemplary image processing system 10 of the present embodiment, together with an ICG injector 700 and a test body 800.

FIG. 1 shows an exemplary image processing system 10 of the present embodiment, together with an ICG injector 700 and a test body 800. The image processing system 10 includes an endoscope 100, an image processor 200, a display 300, an image capturing controller 400, a light emitter 500, and a light emitter controller 600. Note that "A" in FIG. 1 is an enlarged view of a tip 102 of the endoscope 100.

The ICG injector 700 injects, to a test body 800, indocyanine green being a luminescence substance. Although ICG is taken as an example of the luminescence substance in the present embodiment, fluorescent substances other than ICG may be used as the luminescence substance. ICG emits fluorescence having a broad spectrum with its center being 810 nm, by being excited by infrared light having a wavelength of 750 nm for example. When the test body 800 is a living organism, ICG can be injected inside the blood vessels of the living organism by intravenous injection. The image of the blood vessels inside the living organism can be captured by capturing the image of the fluorescence from ICG.

The ICG injector 700 may be incorporated in the image processing system 10. The ICG injector 700 can be controlled so as to maintain the ICG concentration inside the living organism at a certain level, by managing the ICG concentration inside the living organism.

The test body 800 may be a living organism such as a human body, which can serve as a target of image capturing by the image processing system 10. Objects such as blood vessels exist inside the test body 800. The image processing system 10 of the present embodiment corrects blur in a captured image of an object existing deeper than the surface of the test body 800 including the inner surface of an organ.

The endoscope 100 includes an image capturing section 110, a light guide 120, and a clamp port 130. The tip 102 of the endoscope 100 is provided with an objective lens 112 as a part of the image capturing section 110. The tip 102 is also provided with an IR light guide 122, an R light guide 124, a G light guide 126, and a B light guide 128, as part of the light guide 120. The tip 102 is also provided with a nozzle 140. A clamp 135 is inserted to the clamp port 130.

The image capturing section 110 captures an image of light emitted from a luminescence substance or of reflected light resulting from reflection of irradiation light at an object. For example, the image capturing section 110 may include a two-dimensional image capturing device such as a CCD and an optical system, and the optical system includes an objective lens 112. When the light emitted from the luminescence substance is infrared light, the image capturing section 110 can capture an infrared light image. When the irradiation light to the object is white light that includes RGB components for example, the image capturing section 110 may capture respective images for RGB components.

The infrared light and the RGB component light in the image capturing section 110 are captured by a single CCD by separating and filtering incident light by a spectroscopic filter. In this case, each component light image can be captured by switching spectroscopic filters disposed on the optical axis. Spectroscopic filters can alternatively be provided in association with optical axes resulting from division of incident light by means of a half mirror or the like. Alternatively, if a plurality of CCDs are provided for each of the optical axes, each component light image can be synchronously captured. Still alternatively, if respective spectroscopic filters for infrared light and RGB components are provided for each single CCD pixel, a single CCD may capture the image of each component light synchronously.

The light guide 120 can be configured by an optical fiber for example. The light guide 120 guides light generated at the light emitter 500, to the tip 102 of the endoscope 100. The light guide 120 may include an IR light guide 122, an R light guide 124, a G light guide 126, and a B light guide 128. The IR light guide 122 guides infrared light, and the R light guide 124 guides R component light. The G light guide 126 guides G component light, and the B light guide 128 guides B component light.

The light guide 120 may separately irradiate respective component light, by being equipped with an IR light guide 122, an R light guide 124, a G light guide 126, and a B light guide 128 respectively for infrared light, R component light, G component light, and B component light. When each component light is separately irradiated, the image capturing section 110 does not have to be provided with a spectroscopic filter, and there can be only one CCD by arranging to perform image capturing in accordance with the timing for irradiating each component light. When the image capturing section 110 is equipped with a function of capturing an image by separating each component light, it is not necessary to irradiate each component light in a time divisional manner, and accordingly there may be a single light guide 120.

The clamp port 130 guides the clamp 135 to the tip 102. FIG. 1 does not illustrate the form of the tip of the clamp 135. The tip of the clamp 135 may be in a variety of forms. The nozzle 140 is used to dispense water or air.

The image processor 200 processes image data obtained from the image capturing section 110. The display 300 displays the image data processed by the image processor 200. The image capturing controller 400 controls image capturing of the image capturing section 110.

The light emitter 500 emits light to be irradiated from the tip 102 of the endoscope 100. The light generated by the light emitter 500 includes infrared light being excitation light for exciting a luminescence substance, and irradiation light to be irradiated on objects inside the test body 800. The irradiation light includes R component light, G component light, and B component light, for example.

The light emitter controller 600 controls the light emitter 500 by being controlled by the image capturing controller 400. For example, when the image capturing section 110 captures the images of the infrared light, the R component light, the G component light, and the B component light in a time divisional manner, it is possible to control the timing of irradiation of each component light to be synchronized with the timing of image capturing.

Figure 2:
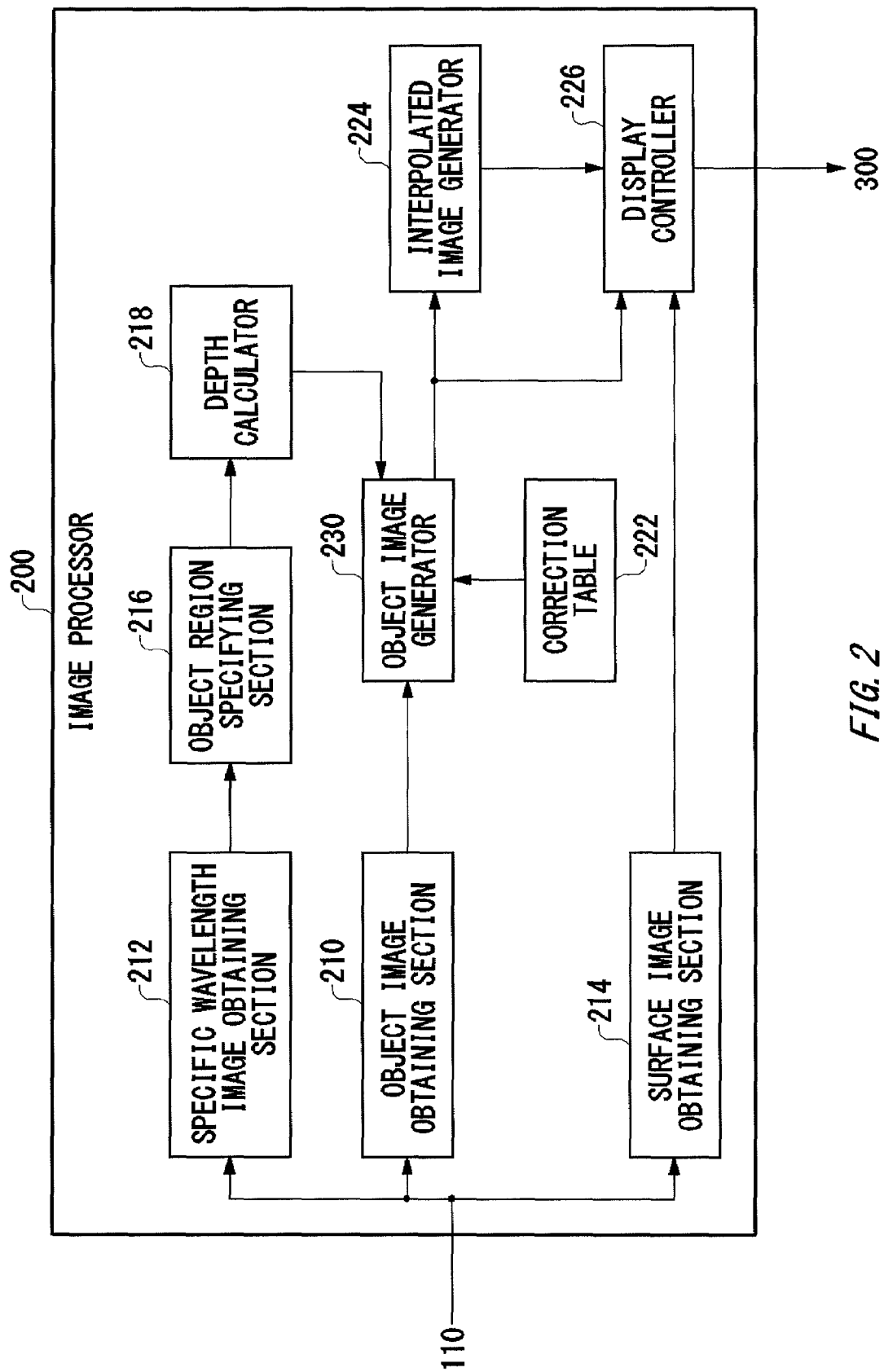
FIG. 2 shows a configuration example of an image processor 200.

FIG. 2 shows a configuration example of an image processor 200. The image processor 200 includes an object image obtaining section 210, a specific wavelength image obtaining section 212, a surface image obtaining section 214, an object region specifying section 216, a depth calculator 218, an object image generator 230, a correction table 222, an interpolated image generator 224, and a display controller 226.

The object image obtaining section 210 obtains an object image being an image of light from an object such as a blood vessel existing inside the test body 800 being a substance. An example of light from an object is fluorescence emitted from a luminescence substance in an object or reflected light of light irradiated at an object. Note that the object image obtaining section 210 may obtain an object image being an image of scattered light resulting from light from an object being scattered in a range from the object to the surface of the substance as detailed later.

When the luminescence emitted from the luminescence substance as light from an object is used, the object image obtained by the object image obtaining section 210 includes an object existing inside the range from the surface of the substance to the depth at which excitation light for exciting the luminescence substance can enter. That is, the excitation light of the luminescence substance irradiated from the tip 102 of the endoscope 100 has a wavelength of 750 nm for example, and so reaches a comparatively deep portion of the test body 800, e.g. about 1 cm. The object image obtained by the object image obtaining section 210 includes an image of blood vessels existing in a comparatively deep portion of the test body 800. The luminescence substance existing in the range of depth which the excitation light can reach is excited by the excitation light, and so the object image obtained by the object image obtaining section 210 includes an image of blood vessels existing in the range of depth which the excitation light can reach. Note that the possibility increases for the fluorescence from a blood vessel being scattered in the test body 800 when the blood vessel is positioned in deeper positions. This means that the possibility increases for a blood vessel being more blurred as the blood vessel exists in deeper positions.

When reflected light from an object is used as light from the object, the object image obtained by the object image obtaining section 210 includes an object existing in a range of depth at which irradiation light to the object enters and is reflected. Because the entry depth of irradiation light to a substance depends on the wavelength of the irradiation light, red light can enter deeper in a substance than blue light, and green light can enter therebetween. Infrared light can enter further deeper in a substance than red light. Consequently, an object image will include an object existing in the range from the substance surface down to the entry depth reflecting the wavelength range of the irradiated light.

The specific wavelength image obtaining section 212 obtains a specific wavelength image being an image of light from an object such as blood vessels belonging to a specific wavelength region. The specific wavelength region may be any wavelength region, and for example may be a red region with its center being an R component of visible light, a green region with its center being a G component, and a blue region with its center being a B component. The specific wavelength region may also be a wavelength region resulting from dividing, into a plurality of regions, a wavelength region to which fluorescence from ICG belongs, and for example may be a long wavelength region, a medium wavelength region, and a short wavelength region, from among the wavelength regions by fluorescence from ICG.

The specific wavelength image using these specific wavelength regions can be used for depth detection of an object such as blood vessels, by using the nature that the entry depth of light to the test body 800 differs if the wavelength differs, or the nature that the absorption factor of light inside the test body 800 differs if the wavelength differs. That is, the blood vessels identifiable by the specific wavelength image of the blue region can be determined to exist in the depth region at which the light of the wavelength belonging to the blue region is reflected. Likewise, the blood vessels identifiable by the specific wavelength image of the green region can be determined to exist in the depth region at which the light of the wavelength belonging to the green region is reflected. Likewise, the blood vessels identifiable by the specific wavelength image of the red region can be determined to exist in the depth region at which the light of the wavelength belonging to the red region is reflected. Note that the depth at which blue light is reflected is shallower than the depth at which red light is reflected, and the depth at which green light is reflected is positioned therebetween.

Moreover, the absorption of light belonging to the long wavelength region is smaller than the absorption of light belonging to a short wavelength region, among the fluorescence emitted from ICG inside the blood vessels. Therefore, the depth of the blood vessels can be estimated from the brightness ratio among the blood vessel images respectively included in the long wavelength region, the medium wavelength region, and the short wavelength region. For example, when the blood vessel image regarding the specific wavelength image of the short wavelength region is darker than the blood vessel image regarding the specific wavelength image of the long wavelength region, the blood vessels can be estimated to exist in a deep position. Conversely, when the blood vessel image regarding the specific wavelength image of the short wavelength region is brighter than the blood vessel image regarding the specific wavelength image of the long wavelength region, the blood vessels can be estimated to exist in a shallow position, because the light path expected to absorb the light in the short wavelength region is not long.

When detecting the depth of an object such as blood vessels making use of the difference in entry depth to a substance by means of the light wavelength, i.e. entry depth of reflected light, the specific wavelength image obtaining section 212 obtains, as a specific wavelength image, a reflected light image being an image of reflected light reflected from an object. The specific wavelength image obtaining section 212 may obtain, as a specific wavelength image, a reflected light image being an image of reflected light from an object belonging to a specific wavelength region, from reflected light resulting from reflecting white light to the object. Alternatively, the specific wavelength image obtaining section 212 may obtain, as a specific wavelength image, a reflected light image being an image of reflected light reflected from an object by irradiating the object with the irradiation light belonging to the specific wavelength region. When detecting the depth of an object such as blood vessels by making use of the difference in absorption factor due to the wavelength of fluorescence generated from the deep portion of a substance, the specific wavelength image obtaining section 212 obtains, as a specific wavelength image, an emitted light image being an image of light belonging to the specific wavelength region, from light emitted from the luminescence substance.

The surface image obtaining section 214 obtains a surface image being an image of a surface of a substance. That is, the surface image obtaining section 214 obtains an image that is equivalent to an image viewed by human eyes. The object region specifying section 216 specifies the image region of an object for each of a plurality of specific wavelength images. That is, the object region specifying section 216 specifies a blood vessel image or the like, by defining the image region of an object such as blood vessels included in the specific wavelength image.

The depth calculator 218 calculates the depth of an object from the surface of the substance, from a plurality of specific wavelength images respectively regarding different specific wavelength regions. As described above, the specific wavelength image includes information about the entry depth of light. Therefore, the depth of an object can be calculated by comparing or computing the brightness of the object included in the specific wavelength image.

For example, the depth calculator 218 may calculate the depth based on the luminance of the image region specified by the object region specifying section 216. For example, the depth calculator 218 may calculate the depth based on the luminance ratio between the image region in the specific wavelength region of the long wavelength region and the image region in the specific wavelength region of the short wavelength region. For example, the depth calculator 218 may calculate the depth based on the maximum luminance or the average luminance in the image region. For example, the depth calculator 218 may calculate the depth based on the change rate in luminance in the end portion of the image region.

Note that the depth calculator 218 may store, in advance, the depth in association with the quantity of ICG existing in a blood vessel and with the luminance of the image of the blood vessel. The depth calculator 218 may calculate the quantity of ICG existing in the test body 800 based on the quantity of ICG injected by the ICG injector 700, to calculate the depth stored in advance in association with the value according to the calculated quantity of ICG and with the value according to the luminance in the image region specified by the object region specifying section 216, as the depth of the blood vessel.

The change rate of the luminance in the end portion of the image region can be represented by a differential coefficient of the luminance where the position, i.e. distance, in the image space is a parameter. The differential coefficient is an example of representing the size of blur of an object regarding the image region as a numerical value. As the differential coefficient becomes large, the blur becomes small, and that the object can be estimated as existing in a shallow position.

Note that the specific wavelength image obtaining section 212 obtains a specific wavelength image being an image of scattered light resulting from light from an object belonging to the specific wavelength region being scattered in the range up to the surface of the substance. Then the depth calculator 218 may calculate the depth based on the luminance in the image region specified by the object region specifying section 216 and the scattering characteristic resulting when a substance scatters light. An example of the scattering characteristic is a scattering coefficient of a substance.

Note that the depth calculator 218 stores, in advance, the scattering characteristic of each portion of the test body 800 in association with the portion. The depth calculator 218 stores, in advance, the above-explained luminance ratio in association with each portion. The depth calculator 218 may calculate the depth based on the scattering characteristic stored in advance in association with a portion in which the object, of which the image is captured as a specific wavelength image, and based on the luminance ratio stored in association with the portion. In this way, the depth calculator 218 may calculate the depth based on the luminance in the image region specified by the object region specifying section as well as on the optical characteristic of the substance.

The object image generator 230 generates the image of the object in accordance with the depth of the object calculated by the depth calculator 218. Specifically, the object image generator 230 corrects the object image in accordance with the depth of the object calculated by the depth calculator 218. That is, the object image generator 230 corrects the spread of the object in the object image by using a correction value. Note that the corrected image corrected by the object image generator 230 is sent to the display 300 to be displayed in the display 300. Note that the concrete process performed by the object image generator 230 is described in greater detail with reference to FIG. 3.

The correction table 222 stores a correction value for correcting the spread of an object in the object image, in association with the depth of the object. The object image generator 230 corrects an object image, by making use of a correction value stored in the correction table 222.

The interpolated image generator 224 generates an interpolated image at the timing of capturing the surface image, from a plurality of corrected images that are consecutive in a chronological order, when the image capturing timing of the surface image is different from the image capturing timing of the corrected image. An exemplary interpolation method is to obtain, from the luminance of each pixel in a plurality of corrected images, the luminance of the pixel in an interpolated image by interpolation.

The display controller 226 controls display of the surface image and the corrected image to the display 300. The display controller 226 can display, on the display 300, the corrected image by changing the brightness or the color of an object in the corrected image according to its depth. The display controller 226 can also display, on the display 300, the surface image next to the corrected image. The display controller 226 can display, on the display 300, an interpolated image as a corrected image. Also, the display controller 226 can display, on the display 300, depth information of an object, as a numerical value.

Figure 3:
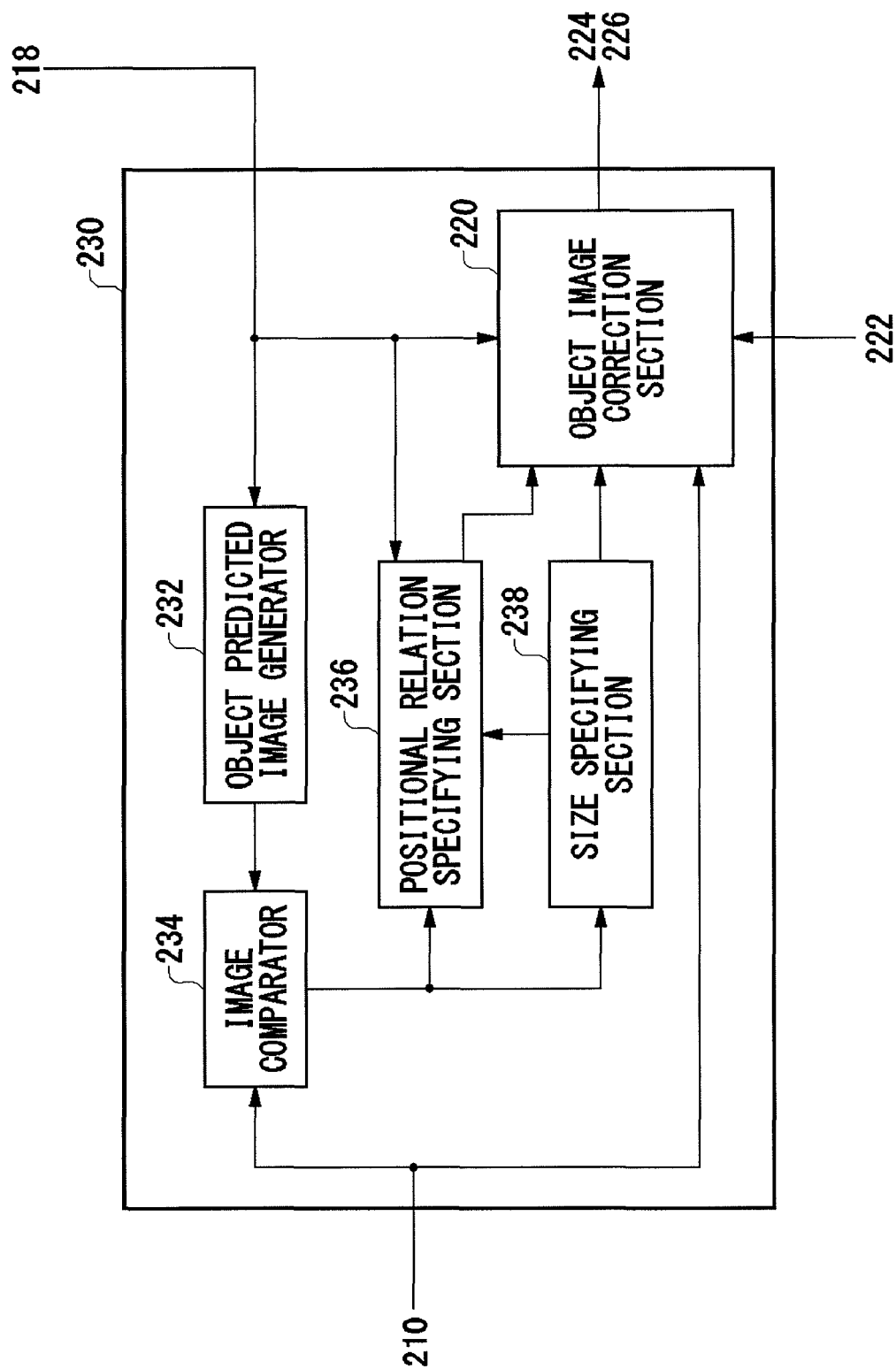
FIG. 3 shows a configuration example of an object image generator 230.

FIG. 3 shows a configuration example of the object image generator 230. The object image generator 230 includes an object image correction section 220, an object prediction image generator 232, an image comparator 234, a positional relation specifying section 236, and a size specifying section 238.

The object image correction section 220 corrects the object image according to the depth of the object calculated by the depth calculator 218. Specifically, the object image correction section 220 corrects the object image according to the depth of the object calculated by the depth calculator 218. For example, the object image correction section 220 corrects the spread of the object in the object image, by using the correction value. Note that the object image correction section 220 can correct the object image by making use of the correction value stored in the correction table 222. The corrected image corrected by the object image correction section 220 is sent to the display 300 to be displayed on the display 300, via the interpolated image generator 224 and the display controller 226.

The object prediction image generator 232 generates an object prediction image being an image of an object to be obtained when the object exists at the depth calculated by the depth calculator 218, for each different size of the object based on the depth calculated by the depth calculator 218. The image comparator 234 compares the object image with a plurality of object prediction images generated by the object prediction image generator 232, respectively. For example, the image comparator 234 compares the object image with the plurality of object prediction images generated by the object prediction image generator 232 respectively, to calculate the image matching level between the plurality of object prediction images and the object image.

In specifying the size of the object captured as the object image, the size specifying section 238 prioritize the size corresponding to an object prediction image corresponding top a high level of matching with the object image, based on the comparison result of the image comparator 234. For example, in specifying the size of the object captured as the object image, the size specifying section 238 may prioritize the size corresponding to an object prediction image corresponding to the highest level of matching with the object image, based on the comparison result of the image comparator 234. For example, in specifying the size of the object captured as the object image, the size specifying section 238 may prioritize the size corresponding to an object prediction image corresponding to a higher level of matching with the object image than a predetermined value, based on the comparison result of the image comparator 234.

The object image correction section 220 may correct the size of the object image to a size in accordance with the size specified by the size specifying section 238. In this way, the object image generator 230 can generate the image of the object having a size in accordance with the size specified by the size specifying section 238.

Note that the depth calculator 218 may calculate the depth of the object captured at each of a plurality of positions in the specific wavelength image, for each of the positions, from the plurality of specific wavelength images. The object prediction image generator 232 generates the object prediction image being an object image to be obtained when a plurality of objects exist in the proximity of each other, for each positional relation among the plurality of objects, based on the depth calculated for each position calculated by the depth calculator 218. The image comparator 234 compares the plurality of object prediction images generated by the object prediction image generator 232 with the object image respectively. For example, the image comparator 234 compares the object image with the plurality of object prediction images generated by the object prediction image generator 232, to calculate the matching level between each of the plurality of object prediction images and the object image.

In specifying the positional relation in the region where the plurality of objects captured as the object image exist in the proximity of each other, the positional relation specifying section 236 prioritizes the positional relation corresponding to the object prediction image corresponding to a high matching level with the object image, based on the comparison result by the image comparator 234. In this way, the positional relation specifying section 236 can specify the positional relation between a plurality of objects captured as the object image, based on the depth calculated by the depth calculator 218 for each position. In addition, the object image correction section 220 corrects the object image, according to the depth calculated by the depth calculator 218 for each position and the positional relation specified by the positional relation specifying section 236.

Figure 4:
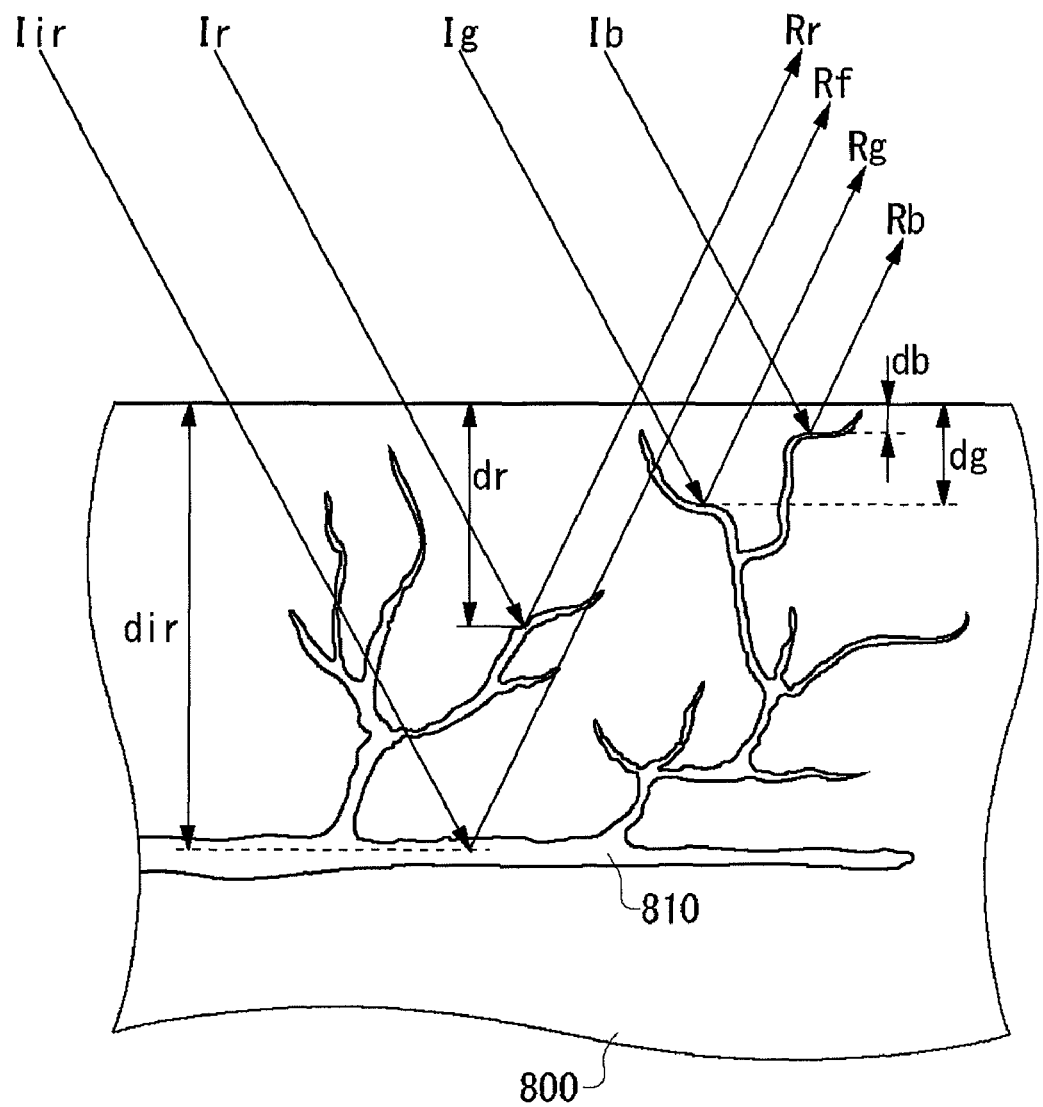

FIG. 4 schematically shows how light is reflected inside the test body 800 or the like. The blood vessels 810, one example of the object, exist inside the test body 800. ICG, being a luminescence substance, has been injected inside the test body 800, and so ICG exists inside the blood vessels 810. Infrared light "Iir", red light "Ir", green light "Ig", and blue light "Ib" are irradiated to the test body 800. The infrared light "Iir" is excitation light of ICG, whereas the red light "Ir", the green light "Ig", and the blue light "Ib" are irradiation light to the blood vessels 810 being the object.

The infrared light "Iir" can enter into a comparatively deep position of the test body 800, and ICG inside the blood vessels 810 existing in the range from the surface to the depth "dir" is excited by the infrared light "Iir". The image of the blood vessels 810 existing in a shallower position than the depth "dir" is obtained as an object image by the fluorescence "Rf" from ICG. Note that the image of the blood vessels 810 obtained as the object image is blurred.

The red light "Ir" enters down to the depth "dr" and is reflected in the vicinity of the depth "dr". Red reflected light "Rr" of red light "Ir" includes image information of the blood vessels 810 near the depth "dr". The image of the blood vessels 810 by means of red reflected light "Rr" is obtained as the specific wavelength image of the red region, and the specific wavelength image of the red region includes an image of the blood vessels 810 in the vicinity of the depth "dr".

The green light "Ig" enters down to the depth "dg" and is reflected in the vicinity of the depth "dg". Green reflected light "Rg" of green light "Ig" includes image information of the blood vessels 810 near the depth "dg". The image of the blood vessels 810 by means of green reflected light "Rg" is obtained as the specific wavelength image of the green region, and the specific wavelength image of the green region includes an image of the blood vessels 810 in the vicinity of the depth "dg".

The blue light "Ib" enters down to the depth "db" and is reflected in the vicinity of the depth "db". Blue reflected light "Rb" of blue light "Ib" includes image information of the blood vessels 810 near the depth "db". The image of the blood vessels 810 by means of blue reflected light "Rb" is obtained as the specific wavelength image of the blue region, and the specific wavelength image of the blue region includes an image of the blood vessels 810 in the vicinity of the depth "db".

For example, the depth of the blood vessels 810 can be specified from respective specific wavelength images of red reflected light "Rr", green reflected light "Rg", and blue reflected light "Rb". The object image of fluorescence "Rf" is corrected using the specified depth.

Figure 5:
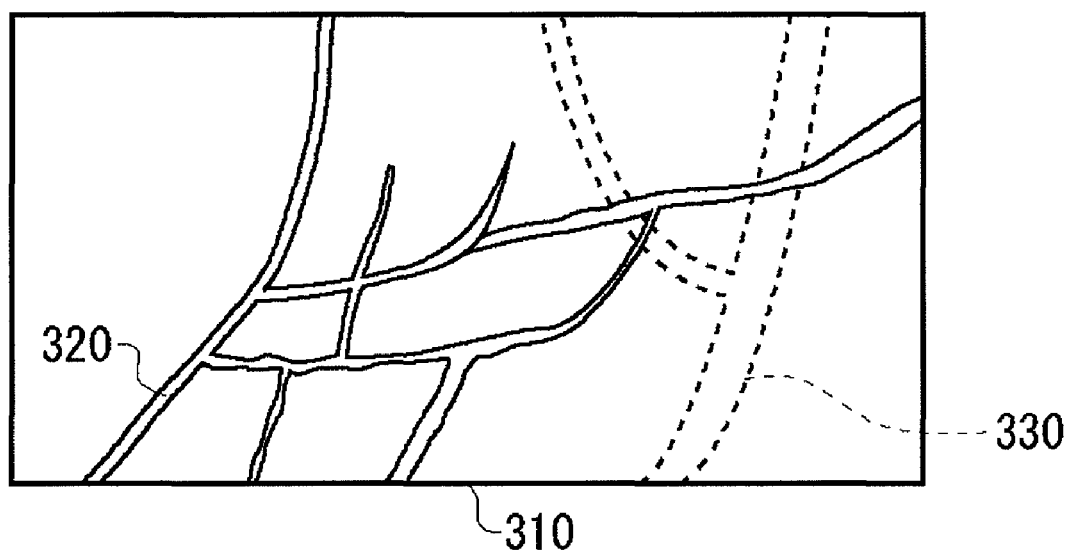
FIG. 5 shows an exemplary display screen 310 of a display 300.

FIG. 5 shows an exemplary display screen 310 of the display 300. The display screen 310 displays the blood vessels 330 in the corrected image resulting from correcting the object image, by being overlapped on the blood vessels 320 of the surface image. The blood vessels 320 of the surface image can be recognized by surface observation of the test body 800. The image processing system 10 of the present embodiment can visualize the blood vessels 330 of the corrected image which cannot be recognized by surface observation.

Note that the blood vessels 320 in the surface image can be recognized visually by surface observation of the test body 800, and so the object image generator 230 does not have to generate a corrected image of the blood vessels 810, of which the depth is calculated by the depth calculator 218 to be shallower than a predetermined depth, and may generate a corrected image of the blood vessels 810, of which the depth is calculated by the depth calculator 218 to be deeper than or the same as the predetermined depth. The display controller 226 may display the blood vessels 330 of the corrected image, in a color different from the color of the blood vessels 320 in the surface image. As a result, the image processing system 10 is able to provide an image by which the blood vessels 810 in a shallow position are easily distinguished from the blood vessels 810 in a deep position.

The blood vessels 330 in the corrected image are corrected by the image processing system 10 of the present embodiment, and so the display is clear without blur in the end portion of the blood vessel image. Note that the depth of the blood vessels 330 from the surface in the corrected image can be displayed in gray scale, or in a different color. The image processing system 10 of the present embodiment may help doctors in an operation and so on clearly recognize the inner blood vessels 330 which cannot be recognized by surface observation, by observation of the display screen 310 of the display 300. Moreover, the image processing system 10 is advantageous in allowing doctors to perform an operation and so on by referring to the depth information of the inner blood vessels 330.

Figure 6:
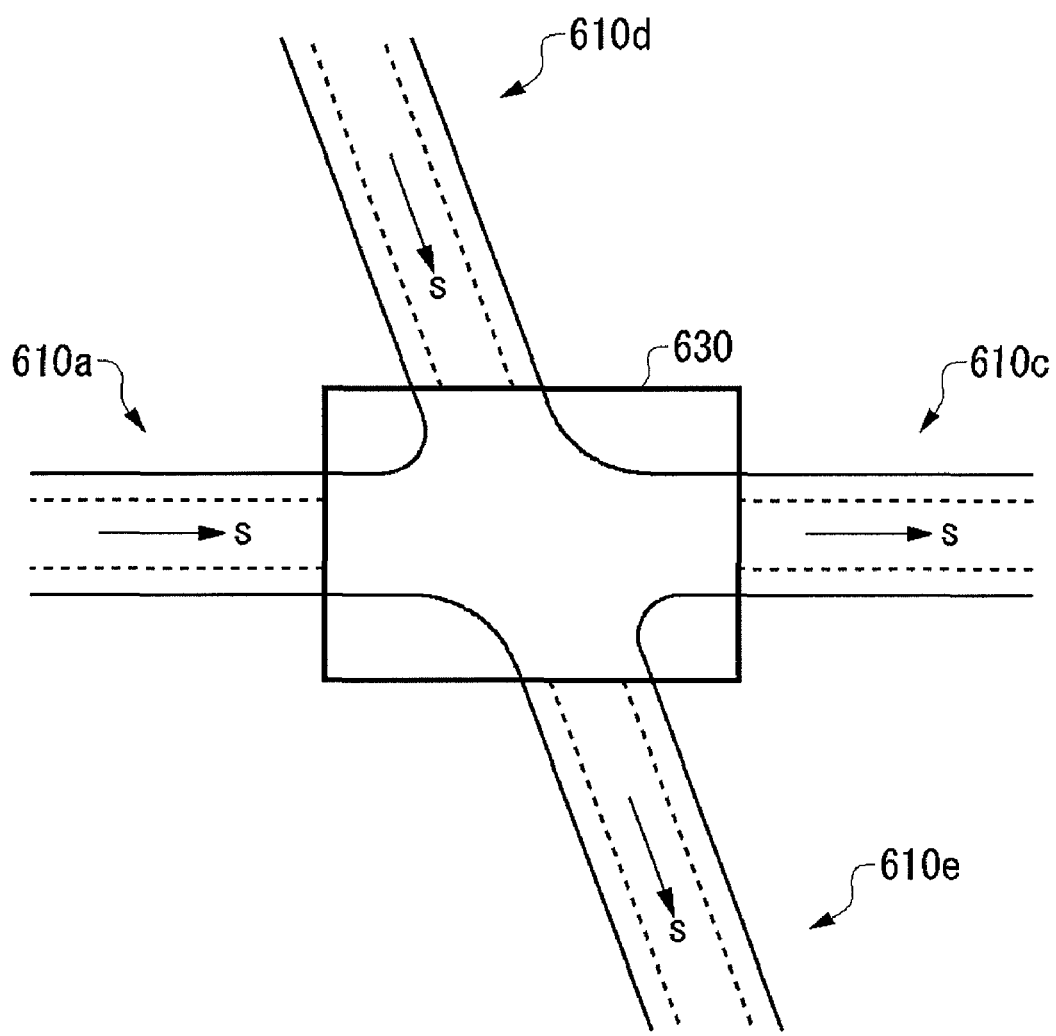
FIG. 6 shows an exemplary blood vessel image being an image of blood vessels 810 intersecting each other.

FIG. 6 shows an exemplary blood vessel image being an image of blood vessels 810 intersecting each other. Each of the blood vessel partial images 610*a-d* is an image of a portion of the blood vessels that is not intersecting the other blood vessels in a specific wavelength image. The region 630 corresponds to an intersection of the blood vessels 810 in the specific wavelength image. The blood vessels 810 in the present embodiment may be different blood vessel portions forming a continuous blood vessel 810. Hereinafter, the blood vessel partial images 610a-d are occasionally collectively referred to as a blood vessel partial image 610.

The depth calculator 218 can calculate the depth of the blood vessels 810 as described above, based on the luminance values of the blood vessel partial images 610a-d in the region where the different blood vessels 810 do not intersect each other. On the other hand, light from the intersection of the different blood vessels 810 will be a combination of light from each of the different blood vessels 810. Therefore, the luminance value of the blood vessel image within the region 630 will be a value representing the summation of the light intensity from each of the different blood vessels 810. This occasionally prevents accurate calculation of the depth of each of the different blood vessels 810, solely from the luminance value of the blood vessel image within the region 630.

In this case, the object image generator 230 specifies the positional relation among the different blood vessels 810 in a detailed method, to generate an image of blood vessels in accordance with the specified positional relation. For example, the object image generator 230 generates the image of the blood vessels exhibiting the specified positional relation or generates a corrected image resulting from correcting the blur of the image of the blood vessels intersecting each other in the object image, based on the specified positional relation. Note that "s" in the drawing shows a path along which the blood vessel runs, which is used in the explanation of FIG. 8.

Figure 7A:
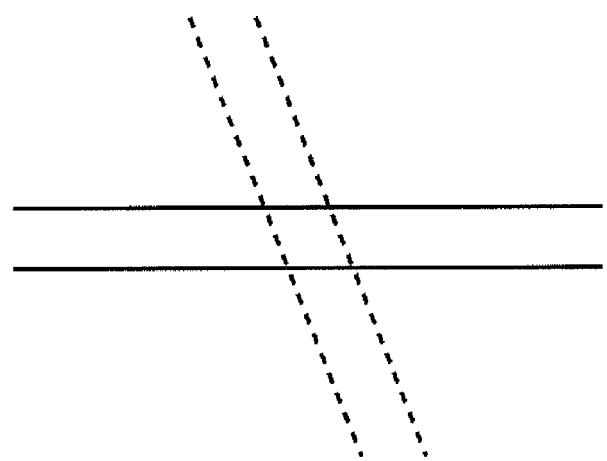
FIGS. 7A, 7B, and 7C show an example of a running state in which the blood vessels run.
Figure 7B:
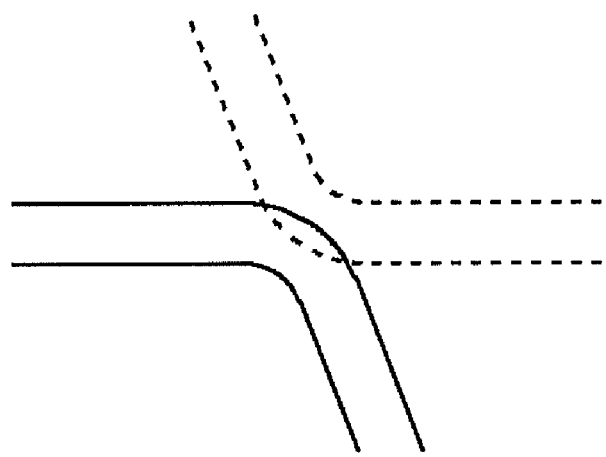
Figure 7C:
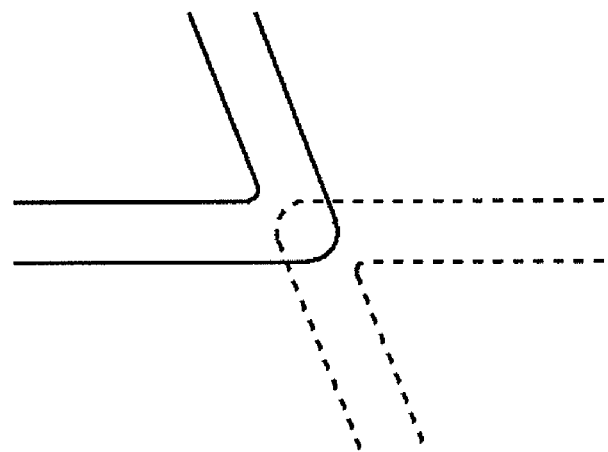

FIGS. 7A, 7B, and 7C show an example of a running state in which the blood vessels run. The blood vessels 810 captured as the image of the blood vessels shown in FIG. 6 are considered to run in one of the states of FIGS. 7A, 7B, and 7C. In the drawings, two blood vessels 810 are distinguished from each other using a solid line and a broken line.

The positional relation specifying section 236 specifies in which running state of FIGS. 7A, 7B, and 7C the two blood vessels 810 run, based on the depths of the blood vessel portions captured as the blood vessel partial images 610a-d. Note that the depth calculator 218 can obtain the depths of the blood vessel portions respectively captured as the blood vessel partial images 610a-d as described above. In the following description, the depth of the blood vessel portion captured as each of the blood vessel partial images 610a-d is simply referred to as the depth derived from each of the blood vessel partial images 610a-d.

For example, when the depth derived from the blood vessel partial image 610a and the depth derived from the blood vessel partial image 610c are either deeper or shallower than both of the depth derived from the blood vessel partial image 610b and the depth derived from the blood vessel partial image 610d, the positional relation specifying section 236 can determine that the different blood vessels 810 are in the positional relation shown in FIG. 7A. When the depth derived from the blood vessel partial image 610a and the depth derived from the blood vessel partial image 610b are either deeper or shallower than both of the depth derived from the blood vessel partial image 610c and the dept fro the blood vessel partial image 610d, the positional relation specifying section 236 can determine that the different blood vessels 810 are in the positional relation shown in FIG. 7B. When the depth derived from the blood vessel partial image 610a and the depth derived from the blood vessel partial image 610d are either deeper or shallower than both of the depth derived from the blood vessel partial image 610b or the dept from the blood vessel partial image 610c, the positional relation specifying section 236 can determine that the different blood vessels 810 are in the positional relation shown in FIG. 7C. In this way, the positional relation specifying section 236 can specify the positional relation between different blood vessels 810 by grouping the depths derived from the blood vessel partial images 610a-d.

As stated above, the positional relation specifying section 236 can specify the positional relation between the different blood vessels 810 based on the depth of each of the blood vessel partial images 610a-d. Note that the positional relation specifying section 236 can select one of a plurality of positional relations based on the curvature of the blood vessels 810 predicted for each of the plurality of positional relations, and specify the selected positional relation as the positional relation of the blood vessels 810.

For example, when the different blood vessels 810 are in the positional relation shown in FIG. 7C, the curvature will be extremely larger than the positional relations shown in FIGS. 7A and 7B. In reality, the possibility of the blood vessels 810 running in the running state shown in FIG. 7C is extremely smaller than the possibility of the blood vessels 810 running in the directions shown in FIGS. 7A and 7B. In view of this, in specifying the positional relation of the blood vessels 810, the positional relation specifying section 236 can prioritize the positional relation where the curvature becomes smaller than a predetermined value over the positional relation where the curvature becomes equal to or larger than the predetermined value. By doing so, it is possible to extremely reduce the possibility that an unrealistic positional relation of the blood vessels 810 is specified.

Note that the positional relation specifying section 236 may specify the positional relation between different blood vessels 810 based on the thicknesses respectively of the blood vessel portions captured respectively as the blood vessel partial images 610a-d, in the same method as the method of specifying the positional relation based on the depth described above. For example, the size specifying section 238 specifies the thicknesses respectively of the blood vessel portions captured respectively as the blood vessel partial images 610a-d. Hereinafter, the thicknesses respectively of the blood vessel portions captured respectively as the blood vessel partial images 610a-d are simply referred to as respective thicknesses derived from the respective blood vessel partial images 610a-d.

The size specifying section 238 can specify the respective thicknesses derived from the blood vessel partial images 610a-d, based on the respective depths derived from the blood vessel partial images 610a-d. For example, the thicknesses of respective blood vessel portions and the blur attributable to the scattering of light from the blood vessels 810 contribute to the respective thicknesses of the blood vessel partial images 610. Therefore, the size specifying section 238 calculates the blur contribution component attributable to the scattering of light, based on the depth derived from each of the blood vessel partial images 610a-d. The size specifying section 238 specifies each of the thicknesses of the blood vessel partial images 610a-d, based on the calculated contribution component and the respective thicknesses of the blood vessel partial images 610a-d. For example, the size specifying section 238 can specify the thickness derived from the blood vessel partial image 610a, by subtracting the calculated contribution component from the thickness of the blood vessel partial image 610a. Note that the thickness of the blood vessel portion may be an example of the size of an object in the present invention.

The positional relation specifying section 236 can determine that the different blood vessels 810 have the positional relation shown in FIG. 7A when the thickness derived from the blood vessel partial image 610a and the thickness derived from the blood vessel partial image 610c are either thicker or narrower than any of the thickness derived from the blood vessel partial image 610b and the thickness derived from the blood vessel partial image 610d. The positional relation specifying section 236 can determine that the different blood vessels 810 have the positional relation shown in FIG. 7B when the thickness derived from the blood vessel partial image 610a and the thickness derived from the blood vessel partial image 610b are either thicker or narrower than any of the thickness derived from the blood vessel partial image 610c and the thickness derived from the blood vessel partial image 610d. The positional relation specifying section 236 can determine that the different blood vessels 810 have the positional relation shown in FIG. 7C when the thickness derived from the blood vessel partial image 610a and the thickness derived from the blood vessel partial image 610d are either thicker or narrower than any of the thickness derived from the blood vessel partial image 610b and the thickness derived from the blood vessel partial image 610c. As a result, the positional relation specifying section 236 can specify the positional relation between the different blood vessels 810 by grouping the thicknesses derived from the respective blood vessel partial images 610a-d.

The positional relation specifying section 236 may specify the positional relation between the different blood vessels 810 by grouping the depths and the thicknesses derived from the respective blood vessel partial images 610a-d. As a result, the positional relation specifying section 236 may specify the positional relation between the different blood vessels 810 based on the depths and the thicknesses derived from the respective blood vessel partial images 610a-d.

Besides the methods described above, the size specifying section 238 may calculate the thickness of the blood vessel portion captured as each of the blood vessel partial images 610a-d, based on the comparison result between the blood vessel partial images 610a-d and the blood vessel prediction image to be obtained when the blood vessel 810 is assumed to exist at the depth calculated by the depth calculator 218. Specifically, the object prediction image generator 232 generates the blood vessel prediction image to be obtained when a blood vessel 810 having a predetermined thickness exists at the depth calculated by the depth calculator 218.

Note that the object prediction image generator 232 may specify the direction in which the blood vessel runs by thinning the blood vessel partial image 610, and generate the blood vessel prediction image to be obtained when the blood vessel 810 having the predetermined thickness and running in the specified direction exists at the depth calculated by the depth calculator 218. Note that the object prediction image generator 232 generates a plurality of blood vessel prediction images, by generating blood vessel prediction images respectively for a plurality of different thicknesses. Note that the blood vessel prediction image may be an example of the object prediction image in the present invention. In addition, the object prediction image generator 232 may thin the blood vessel partial image 610 after performing smoothing and binary processing thereto.

The object prediction image generator 232 can generate the blood vessel prediction image based on the spread quantity of the light from the blood vessel 810 according to the depth calculated by the depth calculator 218. For example, the object prediction image generator 232 can generate the blood vessel prediction image based on a space distribution of the light intensity from the blood vessel portion when the blood vessel portion having a predetermined thickness exists, and a point spread function for light from a point at the depth calculated by the depth calculator 218.

The image comparator 234 calculates the image matching level by respectively comparing the plurality of blood vessel prediction images generated by the object prediction image generator 232 with the blood vessel partial image 610. The size specifying section 238 specifies the blood vessel portion thickness given when generating the blood vessel prediction image corresponding to the highest matching level, as the thickness of the blood vessel portion captured as the blood vessel partial image 610. In this way, the size specifying section 238 can specify the thicknesses derived from the respective blood vessel partial images 610a-d. Note that the size specifying section 238 may specify the value obtained by weighted averaging the given blood vessel portion thickness in generating the blood vessel prediction image corresponding to a higher matching level than the predetermined matching level, as the thickness of the blood vessel portion captured as the blood vessel partial image 610.

Note that the image processor 200 may store the depth calculated by the depth calculator 218 and the thickness calculated by the size specifying section 238, in association with the luminance value of the blood vessel partial image and the thickness of the blood vessel partial image. The depth calculator 218 may calculate the depth stored in association with the luminance value and the thickness of a newly obtained blood vessel partial image, as the depth of the blood vessel portion captured as the newly obtained blood vessel partial image. The size specifying section 238 may specify the thickness stored in association with the luminance value and the thickness of the newly obtained blood vessel partial image, as the thickness of the blood vessel portion captured as the newly obtained blood vessel partial image. As a result, it is possible to swiftly calculate the depth and the thickness of a blood vessel portion, and further to swiftly decide the geometry of the blood vessel 810.

FIGS. 8A, 8B, 8C, and 8D show an example of a depth change in a direction along the running direction "s" of the blood vessels 810. Each of FIGS. 8A, 8B, 8C, and 8D shows the depth change derived from the blood vessel partial image 610a, the depth change derived from the blood vessel partial image 610b, the depth change derived from the blood vessel partial image 610c, and the depth change derived from the blood vessel partial image 610d.

Figure 8A:
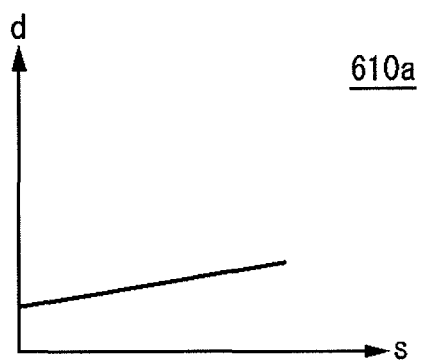
FIGS. 8A, 8B, 8C, and 8D show an example of a depth change in a direction along the running direction "s" of the blood vessels 810.
Figure 8B:
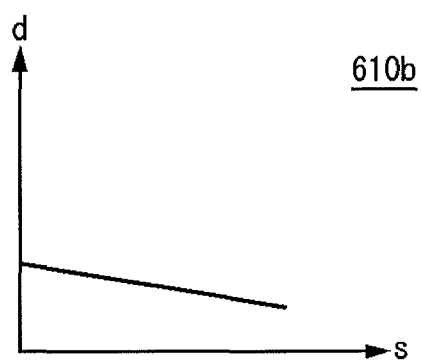
Figure 8C:
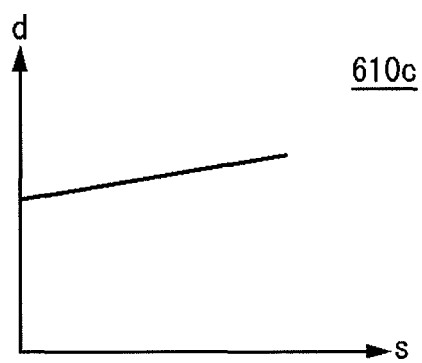
Figure 8D:

FIG. 8A and FIG. 8C show depth increase along the running direction "s", and FIGS. 8B and 8D show depth decrease along the running direction "s". In these cases, the positional relation specifying section 236 may specify the positional relation shown in FIG. 7A, as the positional relation between the different blood vessels 810. In this way, the positional relation specifying section 236 may specify the positional relation between blood vessels 810, by considering the blood vessel partial images showing similar depth changes as images of the same blood vessel 810. In this way, the positional relation specifying section 236 can specify the positional relation, based on the spatial change of the depth of the blood vessel 810. Note that an example of the spatial change of the depth is a differential value of the depth along the running direction "s" of the blood vessel 810. The order of the differential value may be the first order, or the multiple order.

The positional relation specifying section 236 can specify the positional relation based on the thickness change of the blood vessel 810, instead of the depth change described above with reference to the present drawings. For example, the positional relation specifying section 236 may specify the positional relation between the blood vessels 810, by considering the blood vessel partial images showing similar thickness changes as images of the same blood vessel 810.

Figure 9:
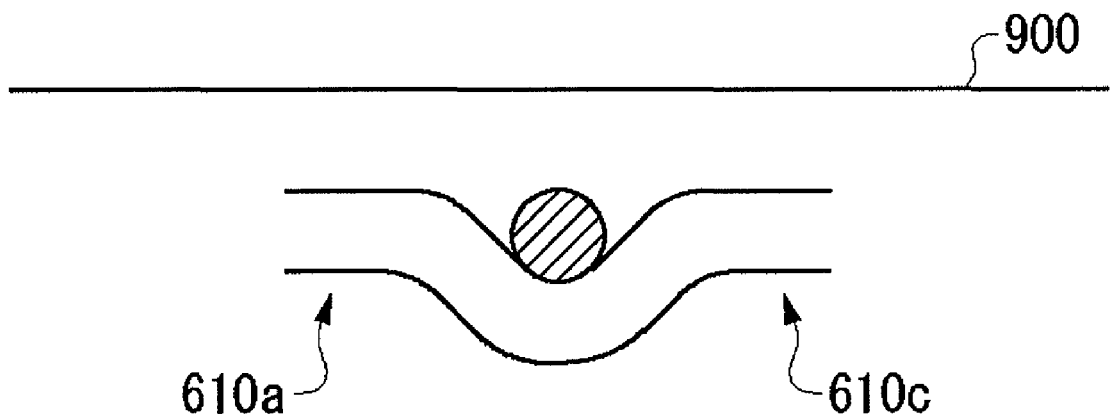
FIG. 9 shows an exemplary positional relation of the blood vessels 810.

FIG. 9 shows an exemplary positional relation of the blood vessels 810. The blood vessels 810 show a sectional view of the blood vessel portions captured as the blood vessel partial image 610a and the blood vessel partial image 610c, taken at the center line thereof, when the blood vessels 810 are in the positional relation of FIG. 7A. When the blood vessels 810 are in the positional relation of the present drawing, the depths, from the surface 900, of the blood vessel portions captured as the blood vessel partial images 610a-d will be substantially the same as each other. For this reason, it is sometimes impossible to specify the positional relation between the blood vessels 810 in their intersection, from the depths of the blood vessel partial images 610a-d. For example, the blood vessel portions captured as the blood vessel partial images 610a and 610c as shown in FIG. 9 can be either deeper or shallower than the other two blood vessel portions in actual cases.

In such cases, the positional relation specifying section 236 can specify the positional relation between the blood vessels 810, based on the comparison result between the blood vessel prediction image when the blood vessels 810 are assumed to have a predetermined positional relation and the images of the blood vessels 810. Specifically, the object prediction image generator 232 generates a blood vessel prediction image obtained when the blood vessels 810 having predetermined thicknesses have the predetermined positional relation.

An example of the positional relation is a combination of a plurality of positional relations regarding the depth of the blood vessels 810 in their intersection and a plurality of positional relations regarding the running direction shown in FIGS. 7A, 7B, and 7C. The object prediction image generator 232 generates a plurality of blood vessel prediction images by generating blood vessel prediction images for each different thickness of the blood vessels 810 and each different positional relation. Note that the blood vessel prediction image may be one example of the object prediction image in the present invention.

The image comparator 234 calculates the image matching level by respectively comparing the plurality of blood vessel prediction images generated by the object prediction image generator 232 and the images of the blood vessels 810 in the region 630. The size specifying section 238 calculates the values given as the thicknesses of the different blood vessels 810 in generating the blood vessel prediction image corresponding to the highest matching level, as respective thicknesses of the different blood vessels 810. In addition, the positional relation specifying section 236 specifies the positional relation given when generating the blood vessel prediction image corresponding to the highest matching level as the positional relation between the different blood vessels 810. In this way, the positional relation specifying section 236 and the size specifying section 238 can specify the positional relation and the thicknesses regarding blood vessels 810 intersecting each other, with higher accuracy.

The above explanation is about 1) a positional relation specifying method based on the depths of blood vessels 810, 2) a positional relation specifying method based on the thicknesses of blood vessels 810, 3) a positional relation specifying method based on the depth change of blood vessels 810, 4) a positional relation specifying method based on the thickness change of blood vessels 810, and 5) a positional relation specifying method based on blood vessel prediction images. The positional relation specifying section 236 can specify the positional relation between the different blood vessels 810 based on any combination among these positional relation specifying methods.

Note that the object image correction section 220 may correct the image of the region in which the blood vessels 810 overlap with each other in an object image, based on the positional relation specified by the positional relation specifying section 236. Specifically, the object image correction section 220 may generate a corrected image in which the image of the blood vessel 810 in a shallow position is more emphasized than the image of the blood vessel 810 in a deep position, based on the positional relation specified by the positional relation specifying section 236. In this way, the object image correction section 220 may correct the object image so as to prioritize the object in a shallower position than the object in a deep position in their display.

As an example, the object image correction section 220 may overwrite the image obtained by correcting the image of the blood vessel 810 in a deep position according to the depth, with the image obtained by correcting the image of the blood vessel 810 in a shallow position according to the depth. In an object image, the pixel value of the region in which the captured blood vessels 810 overlap is a value according to the summation between the contribution component of the blood vessel 810 in a deep position to the pixel value and the contribution component of the blood vessel 810 in a shallow position to the pixel value. As a result of the object image correction section 220 overwriting using the image obtained by correcting the image of the blood vessel in a shallow position according to the depth, only the blood vessel 810 in a shallow position contributes to the pixel value in the region where the captured blood vessels 810 overlap, and the blood vessel 810 in a deep position does not. Accordingly, the object image correction section 220 can generate a corrected image in which the boundary and the running state of the blood vessels 810 in a shallow position are clearer even in the region where the captured blood vessels 810 overlap.

Note that in relation to FIGS. 6-9, the operation of the image processor 200 is explained by taking an example of specifying the positional relation between two blood vessels 810 and generating the image of the two blood vessels 810 according to the specified positional relation. However, the image processor 200 can also specify the positional relation among three or more blood vessels 810 and generate the three or more blood vessels 810 according to the specified positional relation.

As explained above, the image processing system 10 is able to provide a corrected image in which the geometry of a plurality of intersecting or overlapping captured blood vessels 810 is adequately represented. For this reason, doctors or the like are able to visually recognize the running state of the blood vessels 810 easily by observing a corrected image.

Figure 10:
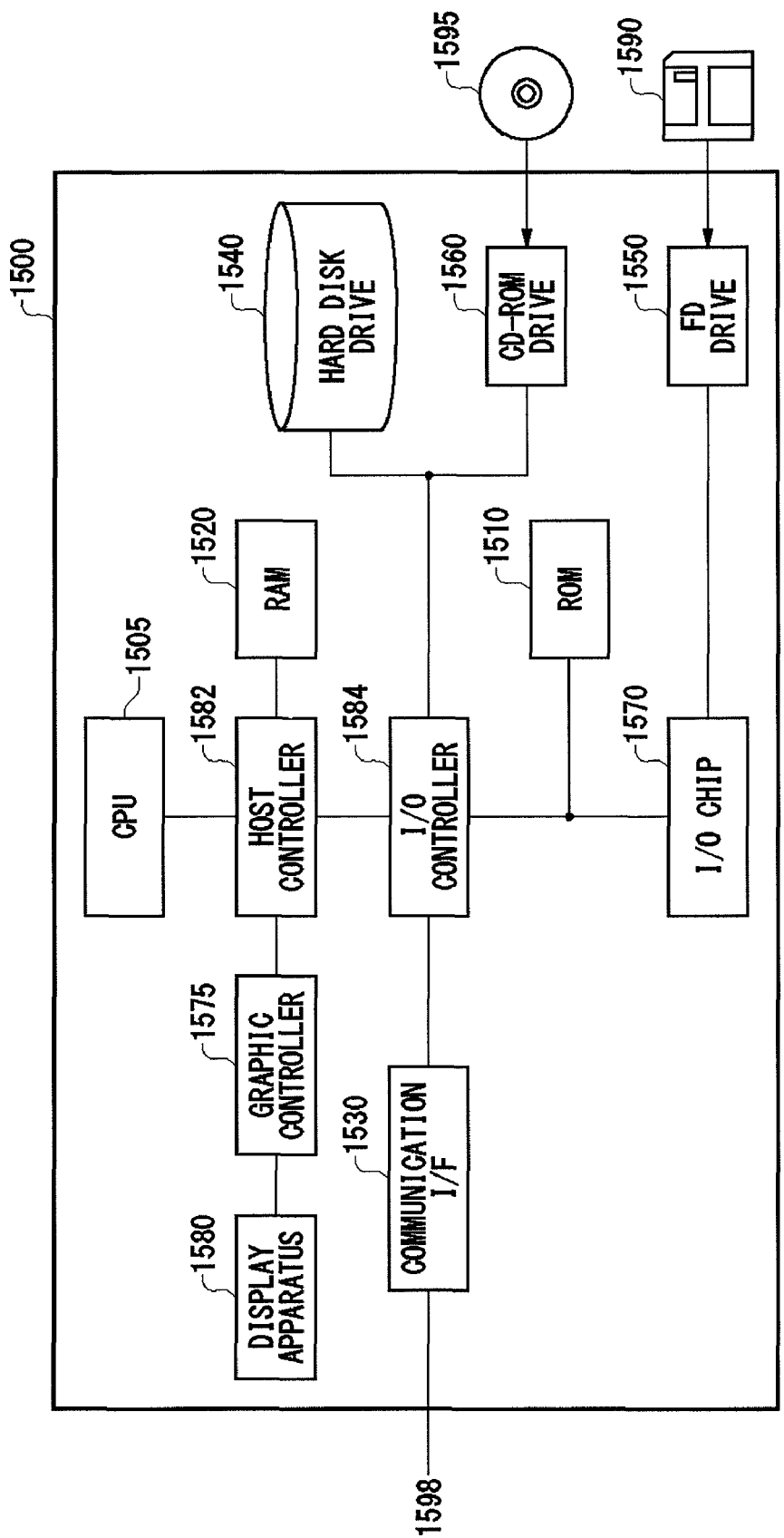
FIG. 10 shows an exemplary hardware configuration of the image processing system 10 according to the present embodiment.

FIG. 10 shows an exemplary hardware configuration of the image processing system 10 according to the present embodiment. The image processing system 10 according to the present embodiment is provided with a CPU peripheral section, an input/output section, and a legacy input/output section. The CPU peripheral section includes a CPU 1505, a RAM 1520, a graphic controller 1575, and a display apparatus 1580 connected to each other by a host controller 1582. The input/output section includes a communication interface 1530, a hard disk drive 1540, and a CD-ROM drive 1560, all of which are connected to the host controller 1582 by an input/output controller 1584. The legacy input/output section includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display apparatus 1580. Alternatively, the graphic controller 1575 may internally include the frame buffer storing the image data generated by the CPU 1505 or the like.

The input/output controller 1584 connects the communication interface 1530 serving as a relatively high speed input/output apparatus, the hard disk drive 1540, and the CD-ROM drive 1560 to the host controller 1582. The communication interface 1530 communicates with other apparatuses via a network. The hard disk drive 1540 stores the programs and data used by the CPU 1505 in the image processing system 10. The CD-ROM drive 1560 reads the programs and data from a CD-ROM 1595 and provides the read programs and data to the hard disk drive 1540 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program executed when the image processing system 10 starts up, a program relying on the hardware of the image processing system 10, and the like. The flexible disk drive 1550 reads programs or data from a flexible disk 1590 and supplies the read programs or data to the hard disk drive 1540 via the RAM 1520. The input/output chip 1570 is connected to a variety of input/output apparatuses via the flexible disk drive 1550, and a parallel port, a serial port, a keyboard port, a mouse port, or the like, for example.

A communication program supplied to the hard disk drive 1540 via the RAM 1520 is provided by a user in a state where it is stored in a storage medium, such as the flexible disk 1590, the CD-ROM 1595, or an IC card. The communication program is read from the recording medium, installed via the RAM 1520 to the hard disk drive 1540 in the image processing system 10, and is executed by the CPU 1505. The communication program installed to the image processing system 10 to be executed acts on the CPU 1505 to cause the image processing system 10 to function as the image processor 200 or the like explained with reference FIGS. 1-9.

Although some aspects of the present invention have been described by way of exemplary embodiments, it should be understood that those skilled in the art might make many changes and substitutions without departing from the spirit and the scope of the present invention which is defined only by the appended claims.

For example, the fluorescence strength from ICG is considered to depend on the concentration of ICG inside the test body 800. ICG decreases by being metabolized by the test body 800, and so it is preferable to compensate the fluorescence strength in accordance with the decrease of the ICG concentration. An exemplary compensation method is to dose ICG according to the elapsed time from the last ICG dose. Other exemplary compensation methods are to increase the excitation light strength for compensating the ICG concentration decrease, and to compensate the value of the correction value dependent on the fluorescence strength.

In the above-described embodiment, the image inside the test body 800 is corrected using the endoscope 100. However, the use of the image processing system 10 according to the present embodiment is not limited to observing images inside a test body 800. For example, it is also possible to use the image processing system 10 in correcting an image of an object existing deep on the surface of the test body 800, which is observable from outside, by irradiating excitation light or irradiation light from outside the test body 800.

The above-described embodiment has mainly dealt with an example of obtaining an object image by utilizing the fluorescence emitted by a luminescence substance included inside an object. However, the object image may also be obtained by irradiating visible light, infrared light, or light of other wavelength ranges to an object, thereby capturing the image of reflected light thereof.

What is claimed is:

1. An image processing system comprising:
   a specific wavelength image obtaining section that obtains a specific wavelength image being an image of light from an object existing inside a substance, the light belonging to a specific wavelength region;
   a depth calculator that calculates a depth of the object from a surface of the substance, using a plurality of specific wavelength images corresponding to different specific wavelength regions from each other; and
   an object image generator that generates an image of the object according to the depth of the object calculated by the depth calculator, further comprising:
   an object image obtaining section that obtains an object image being an image of light from the object, wherein
   the object image generator includes an object image correction section that corrects the object image according to the depth of the object calculated by the depth calculator.

2. The image processing system according to claim 1, wherein
   the specific wavelength image obtaining section obtains, as the specific wavelength image, a reflected light image being an image of reflected light from the object.

3. The image processing system according to claim 2, wherein
   the specific wavelength image obtaining section obtains, as the specific wavelength image, a reflected light image being an image of reflected light belonging to the specific wavelength region, from among the reflected light from the object as a result of irradiating white light to the object.

4. The image processing system according to claim 2, wherein
   the specific wavelength image obtaining section obtains, as the specific wavelength image, a reflected light image being an image of reflected light from the object as a result of irradiating irradiation light belonging to the specific wavelength region to the object.

5. The image processing system according to claim 1, wherein
   the specific wavelength image obtaining section obtains, as the specific wavelength image, an emitted light image being an image of light belonging to the specific wavelength region, from among light emitted from a luminescence substance inside the object.

6. The image processing system according to claim 1, further comprising:
   an object region specifying section that specifies an image region of the object for each of the plurality of specific wavelength images, wherein
   the depth calculator calculates the depth based on luminance in the image region specified by the object region specifying section.

7. The image processing system according to claim 6, wherein the depth calculator calculates the depth according to a ratio between luminance of the image region in the specific wavelength region of a long wavelength region and luminance of the image region in the specific wavelength region of a short wavelength region.

8. The image processing system according to claim 6, wherein
the depth calculator calculates the depth based on maximum luminance or average luminance in the image region.

9. The image processing system according to claim 6, wherein
the depth calculator calculates the depth based on a change rate in luminance in an end portion of the image region.

10. The image processing system according to claim 6, wherein
the depth calculator calculates the depth based on luminance in the image region specified by the object region specifying section and an optical characteristic of the substance.

11. The image processing system according to claim 10, wherein
the object image obtaining section obtains an object image being an image of scattered light resulting from the light from the object being scattered in a range from the object to the surface.

12. The image processing system according to claim 11, wherein
the depth calculator calculates the depth based on luminance in the image region specified by the object region specifying section and a scattering characteristic resulting when the substance scatters light.

13. The image processing system according to claim 1, further comprising:
a correction table that stores a correction value for correcting spread of the object in the object image, in association with the depth of the object, wherein
the object image correction section corrects spread of the object in the object image, by using the correction value.

14. The image processing system according to claim 1, further comprising:
a light emitter that emits excitation light for exciting a luminescence substance inside the object and irradiation light to be irradiated on the object;
an image capturing section that captures an image of light emitted from the luminescence substance and an image of reflected light resulting from reflection of the irradiation light at the object; and
a display that displays a corrected image corrected by the object image correction section.

15. The image processing system according to claim 14, further comprising:
a surface image obtaining section that obtains a surface image being an image of a surface of the substance; and
a display controller that controls display of the surface image and the corrected image on the display.

16. The image processing system according to claim 15, wherein
the display controller displays, on the display, the corrected image by changing brightness or a color of the object in the corrected image according to the depth.

17. The image processing system according to claim 15, wherein
the display controller displays, on the display, the surface image next to the corrected image.

18. The image processing system according to claim 15, further comprising:
an interpolated image generator that generates an interpolated image at a timing of capturing the surface image, from a plurality of corrected images that are consecutive in a chronological order, when the image capturing timing of the surface image is different from an image capturing timing of the corrected image, wherein
the display controller displays, on the display, the interpolated image as the corrected image.

19. The image processing system according to claim 1, wherein
the depth calculator calculates, from a plurality of specific wavelength images, the depth of the object captured in a plurality of positions in the plurality of specific wavelength images, for each of the plurality of positions,
the object image generator further includes:
a positional relation specifying section that specifies a positional relation among a plurality of objects captured as the object image, based on the depth calculated by the depth calculator for each of the plurality of positions, and
the object image correction section corrects the object image according to the depth calculated by the depth calculator for each of the plurality of positions and the positional relation specified by the positional relation specifying section.

20. The image processing system according to claim 19, wherein
the object image generator includes:
an object prediction image generator that generates an object prediction image being an object image to be obtained when a plurality of objects exist in the proximity of each other, for each positional relation among the plurality of objects, based on the depth calculated by the depth calculator for each of a plurality of positions, and
an image comparator that compares the plurality of object prediction images generated by the object prediction image generator with the object image respectively, and
in specifying the positional relation in a region where the plurality of objects captured as the object image exist in the proximity of each other, the positional relation specifying section prioritizes the positional relation for the object prediction image corresponding to a higher matching level with the object image, based on the comparison result by the image comparator.

21. The image processing system according to claim 20, wherein
the object image correction section corrects the object image so as to prioritize, in a display, an object in a shallower position.

22. The image processing system according to claim 1, wherein
the object image generator includes:
an object prediction image generator that generates an object prediction image being an image of the object to be obtained when the object exists at the depth calculated by the depth calculator, for each different size of the object based on the depth calculated by the depth calculator;
an image comparator that compares the object image with a plurality of object prediction images generated by the object prediction image generator respectively; and
a size specifying section that, in specifying the size of the object captured as the object image, prioritizes the size of the object prediction image corresponding to a high level of matching with the object image, based on the comparison result of the image comparator, and the object image correction section corrects the size of the object image to a size in accordance with the size specified by the size specifying section.

23. An image processing method comprising:

obtaining a specific wavelength image being an image of light from an object existing inside a substance, the light belonging to a specific wavelength region;

calculating a depth of the object from a surface of the substance, using a plurality of specific wavelength images corresponding to different specific wavelength regions from each other;

generating an image of the object according to the depth of the object calculated in the object depth calculation; and further comprising:

obtaining an object image being an image of light from the object, wherein the generating the image of the object includes correcting the object image according to the depth of the object calculated by the depth calculator.

24. A computer readable medium storing therein a program for an image processing system, and causing the image processing system to function as:

a specific wavelength image obtaining section that obtains a specific wavelength image being an image of light from an object existing inside a substance, the light belonging to a specific wavelength region;

a depth calculator that calculates a depth of the object from a surface of the substance, using a plurality of specific wavelength images corresponding to different specific wavelength regions from each other; and an object image generator that generates an image of the object according to the depth of the object calculated by the depth calculator; and further comprising:

an object image section that obtains an object image being an image of light from the object, wherein the object image generator includes an object image correction section that corrects the object image according to the depth of the object calculated by the depth calculator.

* * * * *